B. F. HAYNES.
VARIABLE SPEED REVERSIBLE FRICTIONAL GEARING.
APPLICATION FILED MAR. 2, 1916.
1,198,915.
Patented Sept. 19, 1916.
2 SHEETS—SHEET 1.
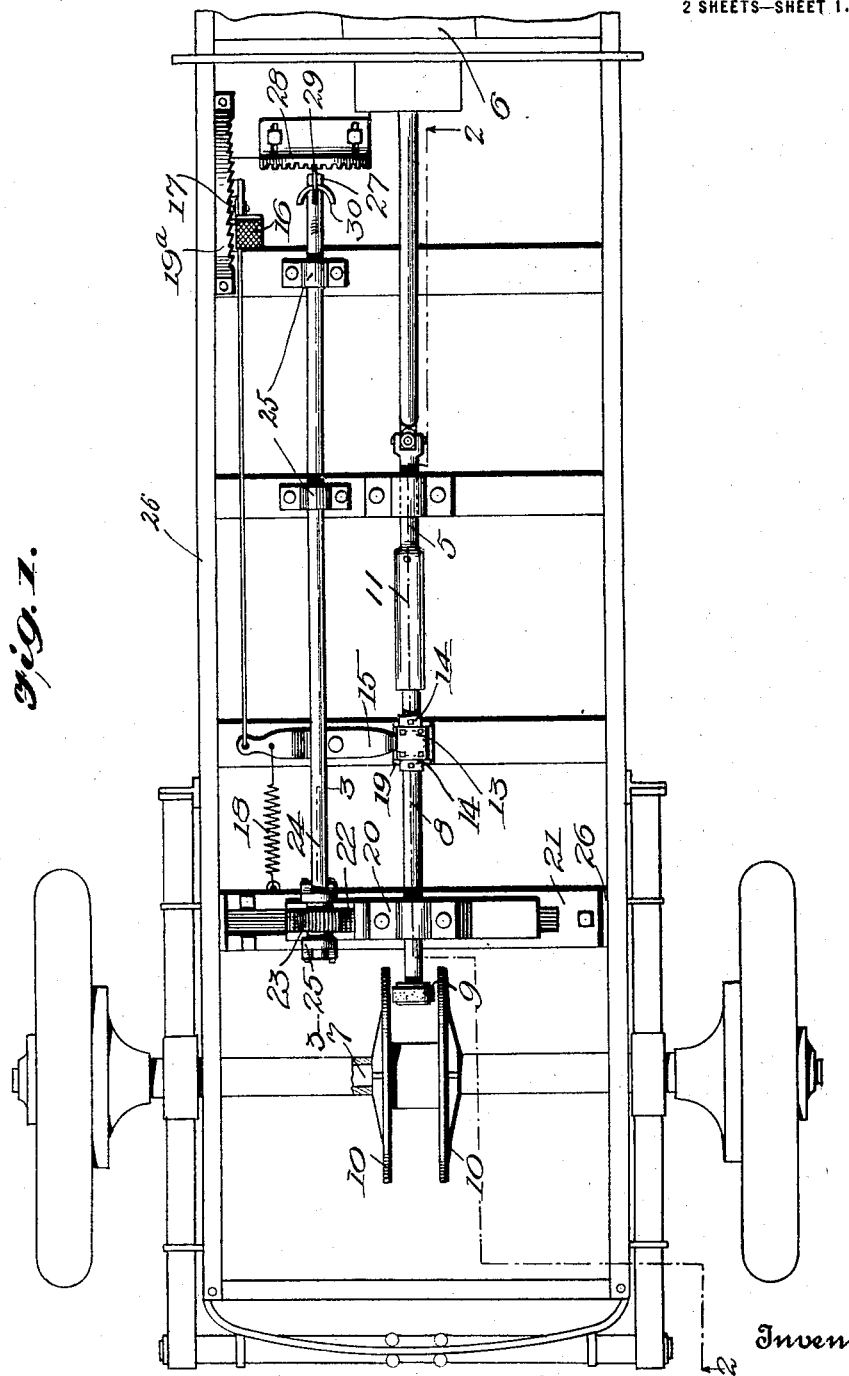
Inventor
BENJAMIN F. HAYNES
By
Attorneys

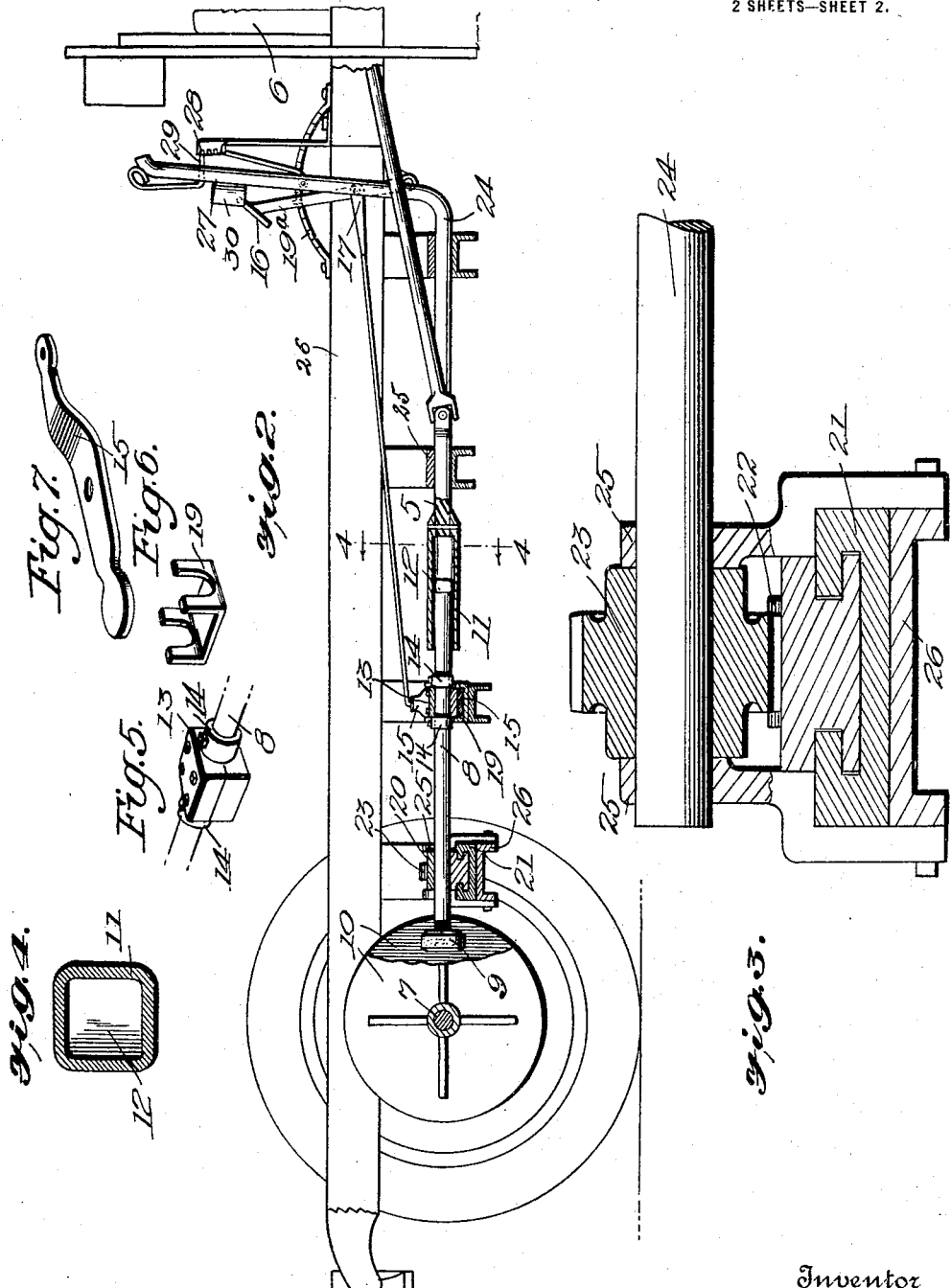

UNITED STATES PATENT OFFICE.

BENJAMIN F. HAYNES, OF TUOLUMNE, CALIFORNIA.

VARIABLE-SPEED REVERSIBLE FRICTIONAL GEARING.

1,198,915.  Specification of Letters Patent.  Patented Sept. 19, 1916.

Application filed March 2, 1916. Serial No. 81,678.

*To all whom it may concern:*

Be it known that I, BENJAMIN F. HAYNES, a citizen of the United States, residing at Tuolumne, in the county of Tuolumne and State of California, have invented certain new and useful Improvements in Variable-Speed Reversible Frictional Gearing, of which the following is a specification.

This invention relates to improvements in drive gearing in which friction means are employed for transmitting the motion of the driving element, and its object is to provide a novel and improved gearing of the kind which can be easily controlled, and which can be readily applied to any machine requiring forward and backward motion without stopping or reversing the driving means, and without jerking or jarring the machine.

The object stated is attained by means of a combination and arrangement of parts to be hereinafter described and claimed, and in order that the same may be better understood, reference is had to the accompanying drawings, in which—

Figure 1 is a plan view of the gearing; Fig. 2 is a longitudinal section on the line 2—2 of Fig. 1; Fig. 3 is a longitudinal section on the line 3—3 of Fig. 1; Fig. 4 is a cross section on the line 4—4 of Fig. 2, and Figs. 5, 6 and 7 are details of certain parts of the mechanism separated.

Referring specifically to the drawings, 5 denotes a driving element which may be the crank shaft of an internal combustion engine 6, if the gearing is employed in connection with an automobile or other motor vehicle. It will be understood, of course, that the invention is not limited, in its application, to motor vehicles, but may be employed wherever a variable driving gearing is required. The element to be driven is a shaft or axle 7 extending at a right angle to the drive shaft 5. If the driven element is the drive axle of a motor vehicle, a differential gear will be employed in connection therewith, as is the usual practice.

The drive shaft 5 has a longitudinal and laterally adjustable section 8 having fixed to its outer end a friction wheel 9 which is located between two friction disks 10 fixed on the driven shaft 7. The longitudinal adjustment of the drive shaft section 8 is provided to obtain a variable speed, the speed at which the shaft 7 is driven increasing as the friction wheel approaches the center of the friction disks. The lateral adjustment of the drive shaft section 8 is for the purpose of obtaining a drive in either direction, and also for throwing the mechanism out of gear, the friction wheel being engageable with either friction disk according to the direction in which the shaft 7 is to be driven. When the friction wheel is clear of both disks, no motion is transmitted.

In order that the drive shaft section 8 may be shifted longitudinally and laterally for the purpose stated, it is slidably and flexibly coupled to the drive shaft 5 by the following means: The adjacent ends of the shaft sections 5 and 8 are spaced and inclosed in a coupling sleeve 11 which is made fast to the shaft 5 and angular on the inside. The end of the shaft section 8 which extends into the sleeve has an enlargement 12 which is angular in cross section to correspond to the cross section of the sleeve, and as the sleeve turns with the shaft 5 it will be evident that a driving connection between the shafts 5 and 8 is provided, the motion of the shaft being transmitted through the sleeve to the shaft section 8. The part 12 tapers slightly from the center, each way, and the remainder of the shaft end inside the sleeve is spaced sufficiently from the latter to permit the shaft section 8 to be shifted laterally, this being done without breaking the driving connection. The shaft section 8 is slidable in the sleeve so that it may be moved longitudinally.

The following means are provided for shifting the shaft section 8 in the direction of its length to obtain a change of speed: Intermediate its ends, the shaft section 8 is supported in a bearing box 13, and held against longitudinal movement through the latter by set collars 14 fast on the shaft section and engaging the ends of the bearing box. A lever 15 carries the bearing box, and upon swinging the lever, the bearing box moves the shaft section 8 in the direction of its length for the purpose stated. The lever 15 is controlled by a pedal or other suitable device 16 having a connection 17 with one end of the lever, and a spring 18 connected to this end of the lever normally holds and returns the same to the position in which the shaft section 8 is retracted and the friction wheel 9 is farthest from the center of the disks 10. The other end of the lever carries a yoke 19 between the branches of which the box 13 seats, the lever also extending between the yoke branches. This structure enables the shaft section 8 to be shifted longitudinally and laterally without any of the parts binding. The pedal 16 is provided with a ratchet lock 19ª.

That end of the shaft section 8 carrying the friction wheel 9 is mounted in a bearing box 20 which is movable laterally to shift the shaft section from one side to the other to place the friction wheel in driving contact with either one of the friction disks 10, or to position the friction wheel clear of both disks. The bearing box is mounted in a slotted support 21 and has at one end a rack 22 with which meshes a pinion 23 fast on the rock shaft 24. Thus, when the shaft 24 is rocked, the bearing box is shifted to effect the lateral adjustment of the shaft section 8 for the purpose stated.

The shaft 24 is supported in suitable bearings 25 mounted on the frame 26 of the machine, said frame being constructed and arranged to support the other bearings and parts of the mechanism. The forward end of the rock shaft 24 has a lever arm 27 whereby it is actuated, a suitable locking rack 28, engageable by a latch 29 on the lever arm, being also provided. The lever arm has a knee rest 30 so that the rock shaft may be actuated by the operator's knee.

While the preferred embodiment of the invention has been shown and described, it will be evident that various changes and modifications in the structural details may be made without a departure from the spirit and scope of the invention as claimed hereinafter.

I claim:—

1. In a friction drive gear, a shaft which is in sections which are flexibly coupled, a friction wheel on one of the shaft sections, said shaft section being also slidable longitudinally, a second shaft, spaced friction disks fixed on the second shaft, between which disks the friction wheel is located, means for shifting the shaft section carrying the friction disk longitudinally, and means for shifting said shaft section laterally.

2. In a friction drive gear, a shaft which is in sections which are flexibly coupled, a friction wheel on one of the shaft sections, said shaft section being also slidable longitudinally, a second shaft, spaced friction disks fixed on the second shaft, between which disks the friction wheel is located, a laterally slidable bearing for the shaft section carrying the friction disk, means for shifting said bearing, a second bearing for said shaft section, a pivoted support for the second bearing, and means for swinging said support.

3. In a friction drive gear, a shaft which is in sections which are flexibly coupled, a friction wheel on one of the shaft sections, said shaft section being also slidable longitudinally, a second shaft, spaced friction disks fixed on the second shaft, between which disks the friction wheel is located, a laterally slidable bearing for the shaft section carrying the friction disk, means for shifting said bearing, a second bearing for said shaft section, a lever carrying the second bearing, and means for swinging said lever.

4. In a friction drive gear, a shaft which is in sections which are flexibly coupled, a friction wheel on one of the shaft sections, said shaft section being also slidable longitudinally, a second shaft, spaced friction disks fixed on the second shaft, between which disks the friction wheel is located, a laterally slidable bearing for the shaft section carrying the friction disk, means for shifting said bearing, a second bearing for said shaft section, a pivoted support for the second bearing, means for swinging said support, and a return spring connected to said support.

5. In a friction drive gear, a shaft which is in sections which are flexibly coupled, a friction wheel on one of the shaft sections, said shaft section being also slidable longitudinally, a second shaft, spaced friction disks fixed on the second shaft, between which disks the friction wheel is located, a laterally slidable bearing for the shaft section carrying the friction disk, means for shifting said bearing, a second bearing for said shaft section, means for holding said shaft section against longitudinal movement in the second bearing, a pivoted support for the second bearing, and means for swinging said support.

6. In a friction drive gear, a shaft which is in sections which are flexibly coupled, a friction wheel on one of the shaft sections, said shaft section being also slidable longitudinally, a second shaft, spaced friction disks fixed on the second shaft, between which disks the friction wheel is located, a laterally slidable bearing for the shaft section carrying the friction disk, a rack extending from said bearing, a pinion in mesh with the rack, a shaft carrying the pinion, actuating means for the pinion shaft, a second bearing for said shaft section, a pivoted support for the second bearing, and means for swinging said support.

In testimony whereof I affix my signature.

BENJAMIN F. HAYNES.